United States Patent Office

Re. 27,818
Reissued Nov. 27, 1973

27,818

TITANIUM DIOXIDE PIGMENT COATED WITH SILICA AND ALUMINA

Alfred J. Werner, Newport, Del., assignor to E. I. du Pont de Nemours and Company, Wilmington, Del.

No Drawing. Original No. 3,437,502, dated Apr. 8, 1969, Ser. No. 717,029, Mar. 28, 1968, which is a continuation-in-part of Ser. No. 519,194, Jan. 7, 1966. Application for reissue June 2, 1972, Ser. No. 259,336
Int. Cl. C09c *1/36*
U.S. Cl. 106—300 10 Claims

Matter enclosed in heavy brackets [ ] appears in the original patent but forms no part of this reissue specification; matter printed in italics indicates the additions made by reissue.

ABSTRACT OF THE DISCLOSURE

Improved titanium dioxide pigments having high opacity and outstanding ease of dispersibility in liquid coating compositions are prepared by wet treatment of a titanium dioxide base pigment by processes wherein from 0.5 to 25 percent of dense silica is precipitated as a dense, adherent coating on the titanium dioxide, and thereafter from 0.1 to 10 percent of alumina is precipitated in an aqueous slurry of the silica-coated pigment, the percents of silica and alumina both being by weight, based on the weight of titanium dioxide. The treated pigment is recovered, dried and preferably dry-milled. Paints made with the finished pigments have excellent smoothness and outstanding durability upon outdoor exposure.

Cross reference to related application

This application is a continuation-in-part of my prior copending application Ser. No. 519,194, filed Jan. 7, 1966.

Background of the invention

Despite the fact that titanium dioxide pigments have outstanding properties in paints, enamels and lacquers, it has been found that such properties can be further improved by suitable modifications of the pigment particle surfaces. U.S. Patent 2,885,366 to Ralph K. Ile describes the surface treatment of calcined titania pigments with a dense skin of silica. The durability of films formed from paints made with such silica-coated pigment is remarkably improved, particularly with regard to outdoor exposure.

To develop the maximum pigment properties of rutile titanium dioxide it is necessary to grind the titanium dioxide at some stage of manufacture. Preferably, this is done in fluid energy mills, although ball mills or other conventional mills are sometimes used. In the case of silica-coated titania, if the grinding is done only before the silica treatment, any aggregates formed during the treatment remain in the product and do not disperse in the organic liquids used as the vehicle of paints made therefrom. The gloss of the paint film is adversely affected and has the appearance of containing grit. However, even if the grinding is done after the silica treatment, the desired degree of size reduction is difficult to achieve and the product is difficult to disperse and lacks optimum opacity and gloss in paint films.

The explanation of the above-mentioned difficulties is not readily apparent. Whether there is some affinity between the silica-coated pigment particles which causes them to agglomerate, or whether the grinding of the pigment breaks off some of the silica coating and exposes the titanium dioxide particles in a manner such that agglomeration is possible, or whether there is some other explanation, the fact remains that such objectionable lack of gloss and opacity seriously detracts from the utility of the silica-treated pigment. According to this invention it has been determined that the gritty appearance noted and low opacity are associated with a difficult or imperfect dispersibility of the coated pigment.

Summary of the invention

The present invention is directed to processes for making novel pigment compositions which are free of the above-discussed deficiencies of prior art pigments, the processes comprising the steps of (1) applying a dense coating of silica to a rutile titanium dioxide pigment, preferably containing from 0.3 to 3.0% by weight of alumina ($Al_2O_3$) formed by co-oxidizing titanium chloride and aluminum chloride, the average titanium dioxide particle size being in the range from about .1 to 1 micron in diameter, preferably .15 to .25 microns, and the amount of silica being in the range from 0.5 to 25%, preferably 5 to 10%, by weight based on the weight of $TiO_2$, said coating being applied by dispersing the pigment in water and mixing therewith an amount of active silica equivalent to the amount of dense silica desired in the final product, precipitating said silica while maintaining the mixture at pH above 7, preferably above 8, a temperature in the range from 40° C. to the boiling point, and an alkali metal ion concentration below about 1 normal, preferably below 0.3 normal, said mixing being sufficiently vigorous so that upon precipitation of the active silica no more than an insignificant proportion of free silica gel is formed in the mixture, whereby silica is precipitated as a dense, adherent, amorphous coating on the titanium dioxide particles; (2) mixing with the resultant slurry about from 0.1 to 10% by weight of $Al_2O_3$, based on the $TiO_2$ as an aqueous solution of a water-soluble aluminum compound, while maintaining the pH below about 4.5 during the addition of at least a portion of the aluminum-containing solution; (3) adjusting the pH to about from 6 to 8 and maintaining the pH in this range until soluble aluminum present has been precipitated as hydrous aluminum oxide; (4) recovering the product; (5) drying it preferably at a temperature below 450° C. and still more preferably below 250° C.; and (6) grinding the product to break up agglomerates. The preferred method of recovering the product in step (4) is by filtration and washing to remove at least a substantial portion of the soluble salts formed during the reaction. Spray drying is the preferred method of removing residual water in step (5). Grinding in step (6) is preferably effected by fluid energy means.

The invention is further particularly directed to the novel pigment produced by the above-described processes. It is characterized as a white, pulverulent composition comprising particles having cores of pigmentary crystalline titanium dioxide, said cores being coated with from 0.5 to 25% of amorphous, dense silica, and there being distributed around said particles from 0.1 to 10% of precipitated alumina, the percentages of silica and alumina being by weight, based on the $TiO_2$.

The pigmentary compositions of this invention have a unique combination of properties which give them exceptional utility. When used in conjunction with film-forming materials the films made therefrom have good opacity and outstanding durability upon outdoor exposure. Additionally, the compositions have excellent dispersibility, both in milling operations and during preparation and application of paints containing them.

Description of the preferred embodiments

The core material.—The titania pigment treated according to this invention can be formed by oxidation of titanium chloride at high temperatures, and especially by the co-oxidation of titanium tetrachloride and aluminum chloride, as described, for example, in Krchma U.S. Patent 2,559,638. Pigmentary rutile derived from the hydrolysis of sulfuric acid solutions of titaniferous materials may also be used. In case such rutile contains appreciable phosphate it is treated as hereinbelow described to improve the durability of the finished pigment. The average titanium dioxide particle size should be in the range of 0.05 to 0.5 micron in radius, that is, the diameter should be from 0.1 to 1.0 micron. Particularly preferred are particles having diameters of from .15 to .25 micron. The amount of co-oxidized alumina will ordinarily be in the range of .3 to 3% based on the weight of $TiO_2$. Pigmentary particles having an average size in these ranges are amenable to improvement by the method of this invention. The larger particles are usually aggregates which need to be disintegrated prior to use to get the best results with respect, for example, to good gloss in a paint and hiding powder efficiency. For these reasons it is preferred that the primary particles of the base pigment, to which the coating process of this invention is applied, be initially well dispersed.

Treating core material containing phosphate.—Pigmentary rutile, obtained by dissolving ores or slags in sulfuric acid followed by hydrolytically precipitating $TiO_2$ in the presence of seed and subsequently calcined to develop the desired particle size and crystallinity, frequently contains up to 1% of phosphate calculated as $P_2O_5$. This impurity appears to diminish the effects of the instant invention particularly with respect to the durability of compositions containing the treated pigment when exposed to outdoor conditions. The deleterious effect of this impurity may be overcome by: (1) removing the phosphate by leaching the pigment in caustic and washing, or (2) fixing the phosphate by combining it with an element such as calcium, magnesium, aluminum, zinc or other metallic element which results in the formation of a white insoluble phosphate. After either of these treatments the rutile pigments originating from sulfuric acid hydrolysis may be benefitted by this invention in substantially the same manner as are the vapor phase oxidation products.

The effect of core particle size.—Rutile pigments are believed to exhibit maximum light scattering and hence best opacity in a gloss paint when the weight median single particle diameter is in the .20–.22 micron range. However, particles of smaller size are very useful, especially in non-gloss finishes when the median is considerably smaller, for example about .17 micron. Such fine pigments, of course, present a greater surface area to their environment and hence it would be expected that finer $TiO_2$ particles would offer greater area for the photodegradation of a vehicle containing them and thus decrease the durability of the coating. I have found that surprisingly the reverse is true when the instant silica and alumina treatment is applied. Therefore, the choice of finer particles for treatment under this invention offers a route to outstanding durability on outdoor exposure. Base pigments having a median particle diameter of from .15 to .19 micron illustrate this range.

Instead of taking electronmicrographs and measuring several hundred images to obtain the average particle size one may select the pigment by means of its carbon black undertone, abbreviated CBU. This is done by mulling together a suitable liquid, such as a light colored oil, and standard weights of the sample and a standard carbon black. The mixture is spread with a standard mixture on a panel and the relative blueness of the gray mixture observed. The degree of blueness is accepted as a measure of particle size, the finer particles giving rise to the bluer undertone.

Coating the core particles with silica.—It is important that the silica coating on the titania be dense rather than porous and be present as a film or skin around the individual titania particles. The amount of silica present as free silica fragments or gel should be a minimum. Under electron microscope examination at a high degree of magnification, the nature of the coating on the titania particles can be readily seen, because the density of titania is roughly about twice that of silica and the electron beam penetrates the silica more readily than the titania, thus giving a sharp contrast in the density of the image on the electron micrographs. Such micrographs of titania coated with silica by the Iler method clearly show that the silica is present as a coating of substantially uniform thickness around the titania particles. In contrast, in electronmicrographs of titania particles with which silica has been precipitated indiscriminately by conventional methods, the silica is present as a voluminous mass of extremely fine particles, that is, a silica gel is formed between the titania particles and not at all thereupon.

The above-mentioned Iler patent describes various ways in which a dense silica coating can be formed upon various substrates. Such disclosures are herein incorporated by reference. In an especially practicable method of the present invention the titania pigment used is the reaction product from a chloride oxidation process reactor, and the silica is formed upon this product by slurrying the titania in water, adding sufficient ammonia or other suitable basic compound to raise the pH to at least 7, and then adding the desired amount of silica in the form of sodium silicate solution, thereby raising the pH to above about 8, preferably about 8 lbs. of silica per 100 lbs. of $TiO_2$, and thereafter slowly adding dilute sulfuric acid or other acidic compound until the pH has dropped to about 7 or below.

During the silica deposition it is desirable to maintain substantially uniform conditions in the reaction zone to prevent precipitation of any substantial amount of free silica gel. This is accomplished by maintaining good agitation and introducing the acid through a distributor designed to avoid local overconcentration of acid. The pH can be followed continuously and should fall gradually as the sodium silicate is neutralized. As the neutralization is completed the slurry can, if desired, be cured for periods such as one hour to permit completion of the deposition of silica onto the surface of the $TiO_2$ particles. The curing step comprises holding the slurry at temperatures between 60 and 100° C., preferably about 90° C., for from a half hour to four hours while maintaining the pH of the agitated slurry between 6.0 and 7.5.

Stated in greater detail, in the process for coating the core particles titanium dioxide pigment is dispersed in water to form a slurry ranging in concentration from 100 to 700 grams or more of $TiO_2$ per liter, preferably in the higher concentration range for processing economy and improved durability in outdoor coatings. The pH of the slurry is adjusted to at least 8 and a soluble, i.e., "active," form of silica is added. This includes soluble silicic acid prepared by deionizing alkaline silicate solutions, as well as other forms described in the Iler Patent 2,885,366. The term "active silica" is used generically here to denote the various forms of this agent. Sodium silicate solution, used in conjunction with an acid, is the preferred agent.

To precipitate silica from sodium silicate solution in the $TiO_2$ slurry an acid, typically sulfuric acid, is added under conditions of good agitation to cause very rapid diffusion of the acid reagent into the alkaline medium, thus substantially avoiding local pH conditions below 8. A compatible acidic substance is normally a commercial acid such as sulfuric, nitric, hydrochloric, acetic, etc., but any acid substance which does not discolor the product nor react to precipitate an undesired solid may be used. Examples are sodium bisulfate, carbonic acid, etc. Enough acid is added under these special conditions to precipitate the silica and lower the pH of the slurry to 8 or below.

"Active silica" is in a state of incipient precipitation so that under the influence of aging, elevated temperature or change of pH it deposits gradually on the pigment surface. The active silica may be prepared and then added to the slurry, the foremost example of which is colloidal silicic acid obtained by removing the sodium ions from a sodium silicate solution by means of ion exchange resins. The sodium silicate solution may be acid-treated before use to bring the silicic acid to near precipitation and then added to the slurry for precipitation, usually by further slow lowering of the pH. Or, the active silica can be generated in situ by adding sodium silicate to the slurry under high alkalinity and adding acid, simultaneously or subsequently, to bring the silica to the active state for precipitation above pH 7 as a coating on the pigment.

The coating operation is preferably carried out at an elevated temperature below the boiling point of the slurry, for example, between 40° C. and the boiling point, and any alkali metal ion present is maintained at a concentration of less than 1 normal, preferably less than 0.3 normal. Preferred procedures are described in the above-mentioned Iler Patent 2,885,366. The amount of silica in the coating can range from 0.5 to 25 %and preferably from 5 to 10% by weight calculated as $SiO_2$ and based on the $TiO_2$ content of the product.

Although the final product of this invention may exhibit greater surface area per gram of product than does the base pigment, this is believed due in small part to very fine particles of silica dislodged from the complex particles in handling or in milling steps and in large part to the finally precipitated alumina. The basic character of the individual silica-coated particles is believed to resemble quite closely that set forth in the Iler patent with respect to surface area parameters. Strict adherence to the conditions of rate of precipitating the silica as set forth in the Iler patent is not necessary in this instance although that procedure insures the desired silica coating. It is only essential that a dense, substantially complete coating be obtained by precipitation under alkaline conditions.

Various methods of avoiding rapid local lowering of the pH during acidification to precipitate silica can be used. Good agitation and introduction of rather dilute acids are advisable. As a further guard against the creation of pockets of low pH which will have a significant lifetime, the acid solution should be injected and diffused into the alkaline medium in small streams at a multiplicity of points. Agitation and rapid diffusion can be accomplished by recirculation of the slurry through a pipeline into which a series of small streams of acid are fed. A single acid inlet will suffice if the rate of introduction is slow, but a multiplicity of inlets increases the production capacity of the unit. Dilute sulfuric acid in the range of 5 to 25% introduced in small streams has proved satisfactory on a large scale operation.

When the above-described conditions are employed the active silica is generated in situ and precipitated on the titania particles present, and not more than an insignificant proportion of it is deposited as free silica gel not adherent to the pigment particles. The presence of free silica gel can be detected in the final product by means of the electron microscope. Its presence can also be indicated by an increase in the viscosity of the slurry, particularly if such viscosity increases are not uniformly distributed throughout the batch, but rather, are confined to local areas.

The "soluble" or "active silica" used is preferably released from sodium silicate solution or a similar water soluble alkali metal silicate such as potassium silicate. Sodium silicates having a wide range of $SiO_2/Na_2O$ ratios can be used, but it is preferred that the $Na_2O$ content be high enough to provide a clear water solution for use. Deionized sodium silicate solutions prepared by contacting such solutions with cation exchange resins can be used, thus reducing the soluble salt content of the slurry and greatly lowering the acid requirement. The more or less complete absence of salts, however, may cause difficulty in the subsequent filtration step, but the essential coagulationg ions can be introduced in the subsequent step when alumina is added.

The alumina additions.—The silica-coated particles in the slurry are next treated in situ with precipitated hydrous alumina in amounts ranging from 0.1 to 10% by weight, calculated as $Al_2O_3$ based on the $TiO_2$. The preferred amount is in the 0.1 to 5% range. This is done by adding a soluble aluminum compound to the slurry while maintaining the pH of the slurry below about 7, preferably below 4.5, and then adjusting the pH to near neutrality to complete precipitation of the alumina and provide a substantially neutral product.

The precipitation of the alumina must be carried out under the proper conditions. To obtain the benefits of fast filtration and the related pigment dispersibility, it is essential to precipitate at least a portion of the alumina, amounting to 0.1% or more, based on the $TiO_2$, by neutralizing an acidic aluminum-containing solution, preferably of pH below 4.5. One procedure for precipitating the hydrous alumina on the acid side is to add aluminum sulfate, i.e., alum, solution to the slurry while maintaining the pH of the slurry below about 3.5, using additional acid if necessary, and then adding a base to raise the pH to about 6, thereby precipitating the alumina. Another procedure employs the simultaneous addition of sodium aluminate solution and an acid or acid salt such as alum, in such proportions that the pH is maintained between 4.5 and 6. In a specific case this simultaneous procedure could be carried out at pH 5 whereby most of the alumina is immediately precipitated, with the remainder being precipitated upon adjustment of the pH to about 7. In any case it is desirable to adjust the pH of the slurry to near neutrality, such as in the range of 6.5 to 7, before filtering and washing.

The alumina, thus precipitated, does not necessarily coat the pigment particles but at least forms a separate phase intimately mixed with them. Although electronmicroscopy does not distinguish between the silica and the alumina, this conclusion is inferred from the appearance of electronmicrographs taken before and after addition of the alumina.

The added alumina performs several functions pertaining to the properties of the final product.

(1) The alumina precipitated from acid solution in the silica-coated $TiO_2$ slurry by neutralization of the acid serves first to improve the filtration and washing rate of the pigment. This not only has process advantages but also the filter cake, apparently because it consists of relatively loose flocs, upon drying is found to be more readily dispersed in the ultimate vehicle, such as a plastic or paint. Then too, probably because of this better dispersibility, the pigment exhibits better opacity and tinting strength. This advantage of better filterability is realized throughout the full range of treatment but is most efficient in the range of from 0.1 to 2% $Al_2O_3$ with a peak at 1%.

(2) A second major effect of the alumina is to increase the exterior durability of coating compositions containing the pigment. While the silica coating affords a marked improvement in this respect each increment of added alumina shows a further increase in durability even above the 10% level. However, due to the dilution of the primary pigment at this high treatment level one usually finds 10% $Al_2O_3$ to be a practical maximum unless the ultimate in durability is desired even at some loss of such properties as hiding power. Tests have shown that each added percent of $Al_2O_3$ yields about 7 percent increase in durability.

(3) The alumina results in a marked increase in the oil absorption of the final product. For example, a pigment with a 10% silica coating might have an oil absorption of 18. Small amounts of alumina will raise this value slightly and improve dispersion so that the product may be used in a gloss paint while about 10% $Al_2O_3$ will raise the oil absorption to the 25 range making it well suited for use in a flat paint of high opacity. This effect is consistent with the appearance of alumina treated pigment in electronmicrographs which show an abundance of very fine material between the primary coated $TiO_2$ particles.

(4) The alumina tends to increase the viscosity of coating compositions. This, in some emulsion paints, provides improved rheological properties such as better handling and body.

The improved filterability, with its ensuing advantages, is obtained by precipitation of the alumina from acid solution in the pigment slurry. To gain this advantage the solution of the aluminum salt such as alum, aluminum sulfate, or sodium aluminate may be added to the slurry while the latter is maintained at a pH low enough to keep the alumina dissolved. This is below approximately 4.5 pH and preferably below 4. This acid solution is then neutralized to precipitate the alumina. The simultaneous addition of an acidic aluminum solution with a base, or an aluminate solution with an acid so as to maintain the slurry pH below about 6 is effective.

Alumina precipitated from alkaline solution in the slurry is not as effective in promoting filtration, but is effective in increasing durability against exterior exposure. It is therefore within the scope of this invention to obtain both types of advantages even though one may obtain the durability without the improved filtration, by precipitating the aluminum by adding acid to an alkaline slurry containing soluble aluminate. One may achieve all the advantages if at least a portion of the alumina is precipitated from acid solution in the slurry by the addition of a base. At least 0.1% of $Al_2O_3$ based on the $TiO_2$ should be precipitated in this manner while the remainder may be precipitated in any convenient manner.

As an example, a slurry of silica-coated $TiO_2$ may be adjusted to pH 3 or below and aluminum solution equivalent to a 1% $Al_2O_3$ treatment added. Then an alkali, which may be an alkali aluminate solution, is added to raise the pH to above 4.5. The alumina thus precipitated will aid filtration. Further, addition of the aluminate and a neutralizing acid may be employed to increase the aluminum treatment. During this treatment, the pH is kept below 8 to avoid resolution of alumina, and is eventually adjusted to about 7 for filtration and recovery.

Recovering the product.—The slurry of $TiO_2$ treated by the steps just described has certain characteristic rheological properties. At low alumina levels it is very thixotropic, but may be picked up and dewatered on the usual vacuum rotary-type filter and washed while still on the filter. If, however, it is removed from the filter and repulped for washing, it is found to be rather unmanageable, being extremely thixotropic. For this reason the filtering and washing are done without removal from the filter. The soluble salts are thus washed out. Washing is preferably continued until the filtrate is quite free of ions. The washed cake is then ready for drying. At high alumina levels the thixotropic character is less pronounced.

The drying and grinding steps.—The preferred commercial method of drying the product is spray drying with either heated air or superheated steam, preferably at temperatures which do not heat the pigment above 450° C. Variations in the drying temperature may be employed to give minor control of the ultimate pigment properties.

The dried pigment can be ground, preferably in a fluid energy mill, to disintegrate loose aggregates which have formed in the drying.

The products.—Electron micrographs of the products prepared as above described show the presence of a uniform dense coating on the $TiO_2$. There is some background debris, which is probably loose silica or alumina resulting from the grinding operation. The pigment is readily dispersible in conventional vehicles to give coating compositions having all of the conventional advantages of such compositions pigmented with titania and which have the further advantages that they form smooth, blemish-free films upon drawn-down which films have good opacity and outstanding durability upon outdoor exposure.

The invention will be better understood by reference to the following illustrative examples.

EXAMPLE 1

This example illustrates a method of applying the improvement of this invention to a typical rutile pigment.

The base of core material used was prepared by the high temperature oxidation of titanium tetrachloride vapor containing an amount of aluminum trichloride vapor equivalent to 1.2% $Al_2O_3$ based on $TiO_2$. The vapors were mixed in a high temperature reaction zone with oxygen containing a small amount of water vapor and a small amount of potassium chloride, in accordance with techniques described in U.S. Patents 2,791,490, 2,488,440, 2,559,638 and 3,208,866. The base rutile pigment so produced had a normal particle diameter distribution with maximum frequency of 0.22 micron and surface area of 8.5 square meters per gram.

Forty-two thousand pounds of this pigment were slurried in sufficient water to give a concentration of 720 gm./liter. This slurry had a pH of 3.7 due to residual HCl and $Cl_2$ from the oxidation step. This slurry was made in a tank having a strong sweep agitator. Finally, sufficient water was added to reduce the $TiO_2$ concentration to 300 g./l.

Then, 45 gal. of 28% aqueous ammonia were added to raise the pH to 9.1 and 2,012 gal. of sodium silicate solution containing 200 g./l. $SiO_2$, equivalent to 8% $SiO_2$ by weight, based on the $TiO_2$, where added during the agitation over a period of about two hours to insure good mixing and a stable condition of alkalinity. The pH was then 11.0. To further reduce the pigment concentration to 200 g./l. 6530 gal. of water were added, and the slurry was heated to 90° C. in about one hour. The pH of the slurry was then gradually lowered, and silica was precipitated upon the titania particles, by adding 10% sulfuric acid through a special distributor pipe having ¼" holes spaced 12" apart mounted horizontally just above the slurry. Addition of 2,060 gal. of acid was effected over a period of five hours while good agitation is maintained in the slurry. By means of pH electrodes mounted in the tank it was shown that the pH of the slurry was gradually lowered during this period, remaining above 8 until near the end of the acid addition. The pH readings with time were as follows:

| | |
|---|---|
| Start of acid addition | 11.0 |
| 1 hour | 10.2 |
| 2 hours | 10.2 |
| 3 hours | 9.7 |
| 4 hours | 8.2 |
| 4½ hours | 6.1 |

After acid addition the slurry was cured by holding it one more hour with agitation. Then, 296 gal. of sodium aluminate solution containing 2.84 lbs. $Al_2O_3$/gal., equivalent to 2% $Al_2O_3$ based on the $TiO_2$ were added simultaneously with 66° Bé. sulfuric acid over a period of ½ hour, leading with the acid so as to maintain the pH of the slurry at about 3.5, whereby some of the alumina was precipitated in the product. Then 50% NaOH solution was added to adjust the pH to 7, using small increments at the end to equilibrate the system and complete precipitation of the alumina.

The slurry was pumped to rotary vacuum washing filters where it was picked up, washed and dewatered. The washing was adjusted so that the washed cake had a specific electrical resistance of at least 7,000 ohms. The discharged filter cake was repulped, adding a minimum of water when necessary, and fed to a spray dryer. Hot air was used in the spray dryer and the dried pigment reached temperatures of from 125 to 150° C. The dry pigment was ground in a fluid energy mill with steam at 250° C.

This treated pigment contained 3.2% $Al_2O_3$ and 8% $SiO_2$ based on the $TiO_2$ content. However, when the pigment was leached with 10% sulfuric acid at 50 to 80° C. for two hours only 2% of $Al_2O_3$ was removed by solution, the remaining 1.2% $Al_2O_3$ being within the $TiO_2$ core. Further leaching with 20% NaOH dissolved silica corresponding to 8% based on the $TiO_2$ as well as about 0.5% more $Al_2O_3$, presumably from the $TiO_2$ core. From leaching tests of this type it was evident that the product comprised a core of $TiO_2$ containing 1.2% $Al_2O_3$, only part of which is available to caustic-leaching. On this core is a dense adherent layer of silica and outside this layer the precipitated alumina is found available to acid-leaching. Electromicroscopic studies reveal that this opaque $TiO_2$ core is surrounded with a more transparent (to electrons) adherent layer of amorphous silica. The precipitated alumina is seen as a loose, fine phase between the coated particles. The surface area of the product was 22 square meters per gram.

The impervious nature of the silica coating obtained by this procedure is shown by its resistance to hot concentrated sulfuric acid. A sample of pigment produced by this example was heated five hours in 96% sulfuric acid at 175° C. Only about 40% of the $TiO_2$ was dissolved. As a control another rutile pigment, also silica- and alumina-treated but not in accord with the method of this invention, was tested in an identical manner. Ninety-five percent of the $TiO_2$ was dissolved.

The pigment of this example shows excellent dispersibility in paint vehicles.

Instead of using sodium aluminate as the source of alumina as in the example, the source of alumina can be aluminum sulfate or aluminum chloride. Thus, one can add an aluminum sulfate or chloride solution instead of simultaneously adding sodium aluminate and sulfuric acid.

EXAMPLE 2

This example illustrates the application of the instant invention to a base $TiO_2$ obtained from the sulfate process. The $TiO_2$ was prepared from an ilmenite from Florida and the resulting $TiO_2$ contained phosphates equivalent to about 0.30% $P_2O_5$.

Prior to calcination the washed pigment was repulped from the filter and a mixture of sodium sulfate and potassium sulfate added to help develop pigment properties during the subsequent calcination. In this experiment the pigment was laboratory-calcined in the 850–975° C. range to develop essentially 100% conversion to rutile. In one set of tests zinc sulfate and magnesium sulfate were added to the calcined feed while in others zinc was used to precipitate the phosphate after calcination in a water slurry of the pigment. Thereafter, the pigments were treated in slurry form according to this invention with 8% $SiO_2$ followed by 2% $Al_2O_3$ precipitated in the slurry by addition of NaOH.

In the following table the samples are identified by code in column 1. The treatment used to deactivate the phosphate is set forth in the second column. In the third column, the durability index for the samples after accelerated exposure in a weatherometer are listed. The fourth column gives the durability index based on 9 months outdoor exposure in Florida. The final sample, 9022–105, is a calcined $TiO_2$ from which $P_2O_5$ was leached with NaOH solution prior to silica treatment.

TABLE

| Code | Treatment for deactivation in calcination | Durability index [1] | |
|---|---|---|---|
| | | Accel. | Fla. |
| 9022-21 | None | 36 | 51 |
| 9022-96 | 0.2% ZnO | 51 | 63 |
| 9022-93 | 0.6% ZnO | 91 | 126 |
| 9022-92 | 1.0% ZnO | 114 | 130 |
| 9022-99 | 1.0% MgO | 91 | 129 |
| In slurry after calc. | | | |
| 9022-97 | None | 58 | 54 |
| 9022-98 | 0.2% ZnO | 59 | 76 |
| 9022-100 | 0.6% ZnO | 80 | 121 |
| 9022-102 | 1.0% ZnO | 78 | 118 |
| Caustic leach | | | |
| 9022-105 | | 137 | 110 |
| 9022-105 | | 137 | 110 |

[1] The larger numbers indicate better durability.

EXAMPLE 3

This example illustrates the extent of increased durability obtained by this invention in the case of using a base pigment of finer partical size as evaluated by the carbon black undertone method. A standard commercial pigment known as R–610 sold by E. I. du Pont de Nemours & Company was taken as a control. It was assigned a carbon black undertone (CBU) value of 8 and a durability index of 100. A first sample, A, was prepared from a base $TiO_2$ pigment having the same CBU as the control but treated according to this invention with a 5% dense, adherent $SiO_2$ coating and 10% of precipitated alumina. Sample B was a 17.5 CBU base $TiO_2$ having a weight median particle width of about .16 micron similarly treated. After exposure in outdoor chalk-fading tests the durability indices were as follows:

| | CBU | Index |
|---|---|---|
| Control | 8 | 100 |
| A | 8 | 140 |
| B | 17.5 | 200 |

The durability index is calcuated as follows and the higher values mean greater durability.

Index=100 x days sample was exposed to reach same degree of degradation as the control divided by the days the control was exposed.

EXAMPLE 4

This example illustrates the effect of carrying out the treatment with silica and alumina using more concentrated slurries of the pigment. A rutile pigment having a CBU of about 12 was slurried in water at the concentrations noted in the table and treated according to this invention under the conditions of Example 1 but on a smaller scale using the usual laboratory equipment and the two levels of silica and alumina treatment shown in the table. The finished pigments were made into the standard blue tinted paints for exposure in comparison with the R–610 standard.

| Treatment | Slurry conc. | Chalk/fade index [1] | |
|---|---|---|---|
| | | Accel. | Outdoor |
| 5% $SiO_2$, 10% $Al_2O_3$ | 200 | 152 | 121 (9 mos. exp.). |
| | 450 | 162 | 127 (9 mos. exp.). |
| 10% $SiO_2$, 1% $Al_2O_3$ | 200 | 112 | 140 (15 mos. exp.). |
| | 420 | 130 | 143 (15 mos. exp.). |

[1] An extensive discussion of this evaluation, by W. H. Dalger and W. H. Madson, is found in vol. 39, July 1967, of the Journal of Paint Technology, pp. 399–410, Specifically the tests used for obtaining data in this application were made on paints of the following formulation:

| | Grams |
|---|---|
| $TiO_2$ pigment | 40.0 |
| Ramapo Blue BP 3660 (Du Pont) | 5.0 |
| Chevron alkyd 2051 (50%) | 100.0 |
| Mineral spirits | 30.0 |
| Xylene | 30.0 |
| 24% Pb naphthenate drier | 1.5 |
| 6% Co naphthenate drier | .22 |
| 6% Mn naphtenate drier | .12 |

The effective high concentration range is believed to be above 400 g./l., preferably between 400 and 650 g./l. Processing economics, such as larger capacity or smaller equipment, and heat savings, as well as improved durability of the product, result.

These ingredients were ground in a rotating glass jar containing 400 gms, of ½" glass balls for about 42 hours and the resulting paint sprayed, without reduction, onto aluminum panels for exposure tests. Control panels prepared in the same manner using the standard pigment were placed in each set for exposure.

Degardation on exposure causes the blue to become white due to chalking. The degree of degradation was measured by recording the red reflectance at various intervals. Red reflectance increases as the chalking progresses. To determine the index numbers reported, the panels were exposed until the instrument gave a fixed reading, arbitrarily set to indicate a well-defined degree of chalking. The index is the ratio of time units required for the test sample to reach this reflectance divided by the time units required by the control times 100.

The instrument used is a spectrophotometer adapted to read light intensity reflected from the panel surface through a red filter having a peak transmission at about 5760 A.

I claim:

1. In a process for improving the ease of dispersibility of a rutile titanium dioxide pigment in liquid film-forming compositions which when dried to thin films have excellent opacity, smoothness and durability upon outdoor exposure, which process includes the steps comprising (1) applying from 0.5 to 25% of dense silica as a dense coating to a rutile titanium dioxide pigment of average particle size from about .1 to 1 micron in diameter *said pigment having been made by oxidizing titanium chloride,* said coating being applied by dispersing the pigment in water and mixing therewith an amount of active silica equivalent to the amount of dense silica desired in the final product while maintaining the mixture at a pH above [7] *8,* a temperature in the range from 40° C. to the boiling point, and an alkali metal ion concentration below about 1 normal, said mixing being sufficiently vigorous to prevent precipitation of more than an insignificant proportion of silica gel in the mixture, gradually neutralizing the mixture thus precipitating silica as a dense adherent, amorphous coating on the titanium dioxide particles and producing a slurry thereof; (2) recovering the product; (3) drying it; and (4) grinding the product to pigmentary size, the improvement which comprises mixing with the slurry of silica-covered titanium dioxide from step (1) about from [0.1] *0.5* to 10% by weight of $Al_2O_3$, based on the $TiO_2$, as an aqueous solution of a water-soluble aluminum compound *while maintaining the pH below 7;* and adjusting the pH to about from [6] *7* to 8 and maintaining it in this range until any soluble aluminum present has been precipitated as hydrous aluminum *oxide.*

2. A process of claim 1 wherein [a portion of] said soluble aluminum compound is an aluminate [and is mixed in at a pH above 8].

3. A process of claim 1 in which the rutile titanium dioxide pigment used as the starting material in step (1) contains from 0.3 to 3% by weight of alumina ($Al_2O_3$) formed by cooxidizing aluminum chloride with titanium chloride and the average titanium dioxide particle size is in the range of .2 to .5 micron in diameter, the amount of silica in the silica coating is in the range of 5 to 10%, the alkali metal ion concentration is maintained below 0.3 normal during the coating process, the slurry is acidified to a pH below 3.5 following step (1), and the product is dried in step (3) at a temperature below 250° C.

[4. A process of claim 1 wherein the rutile pigment used as the starting material in step (1) has a weight median particle diameter in the range of 0.15 to 0.22 micron.]

5. [A] *In a* process [of claim 1 wherein the starting rutile pigment contains phosphate and said phosphate is removed by leaching said pigment with caustic soda and washing, prior to coating the pigment with silica] *for improving the ease of dispersibility of a rutile titanium dioxide pigment in liquid film-forming compositions which when dried to thin films have excellent opacity, smoothness and durability upon outdoor exposure, which process includes the steps comprising (1) applying from 0.5 to 25% of dense silica as a dense coating to a rutile titanium dioxide pigment of average particle size from about .1 to 1 micron in diameter, said pigment having been made by the sulfate process and leached with caustic soda and washed prior to said coating to remove phosphate, said coating being applied by dispersing the pigment in water and mixing therewith an amount of active silica equivalent to the amount of dense silica desired in the fianl product while maintaining the mixture at a pH above 7, a temperature in the range from 40° C. to the boiling point, and an alkali metal ion concentration below about 1 normal, said mixing being sufficiently vigorous to prevent precipitation of more than an insignificant proportion of silica gel in the mixture, gradually neutralizing the mixture thus precipitating silica as a dense adherent, amorphous coating on the titanium dioxide particles and producing a slurry thereof; (2) recovering the product; (3) drying it; and (4) grinding the product to pigmentary size, the improvement which comprises mixing with the slurry of silica-coated titanium dioxide from step (1) about from 0.1 to 10% by weight of $Al_2O_3$, based on the $TiO_2$, as an aqueous solution of a water-soluble aluminum compound; and adjusting the pH to about from 6 to 8 and maintaining it in this range until any soluble aluminum present has been precipitated as hydrous aluminum.*

6. [A] *In a* process [of claim 1 wherein the starting rutile pigment contains phosphate and said phosphate is rendered inactive by combining it with an ion selected from the group consisting of calcium, magnesium, aluminum and zinc, prior to coating the pigment with silica] *for improving the ease of dispersibility of a rutile titanium dioxide pigment in liquid film-forming compositions which when dried to thin films have excellent opacity, smoothness and durability upon outdoor exposure, which process includes the steps comprising (1) applying from 0.5 to 25% tof dense silica as a dense coating to a from 0.5 to 25% of dense silica as a dense coating to a rutile titanium dioxide pigment of average particle size from about .1 to 1 micron in diameter said pigment having been made by the sulfate process and combined with an ion selected from the group consisting of calcium, magnesium, aluminum and zinc, said coating being applied by dispersing the pigment in water and mixing therewith an amount of active silica equivalent to the amount of dense silica desired in the final product while maintaining the mixture at a pH above 7, a temperature in the range from 40° C. to the boiling point, and an alkali metal ion concentration below about 1 normal, said mixing being sufficiently vigorous to prevent precipitation of more than an insignificant proportion of silica gel in the mixture, gradually neutralizing the mixture thus precipitating silica as a dense adherent, amorphous coating on the titanium dioxide particles and producing a slurry thereof; (2) recovering the product; (3) drying it; and (4) grinding the product to pigmentary size, the miprovement which comprises mixing with thte slurry of silica-coated titanium dioxide from step (1) about from 0.1 to 10% by weight of $Al_2O_3$, based on the $TiO_2$, as an aqueous solution of a water-soluble aluminum compound; and adjusting the pH to about from 6 to 8 and maintaining it in this range until any soluble aluminum present has been precipitated as hydrous aluminum.*

[7. A process of claim 1 wherein the titanium dioxide pigment concentration in the water dispersion step (1) prior to coating is greater than 400 grams per liter.]

8. In a process for producing a titanium dioxide pigment having outstanding ease of dispersibility in liquid film-forming compositions which, when dried to thin films, have excellent smoothness and outstanding durability upon outdoor exposure, the steps comprising (1) applying a dense coating of silica to a rutile titanium dioxide pigment made by oxidizing titanium chloride, the average titanium dioxide particle size being in the range from about .1 to 1 micron in diameter, and the amount of silica being in the range from 0.5 to 25% by weight based on the weight of $TiO_2$, said coating being applied by dispersing the pigment in water and adjusting the pH to at least about 8 with an alkali solution, adding an amount of sodium silica sufficient to provide the desired silica content in the product, heating the dispersion to about from 40° C. to the boiling point, and neutralizing the sodium silicate over a period of about from 0.5 to 5 hours with a dilute acid until the pH has dropped to below 8 thus forming the dense silica coating on the titanium dioxide; (2) adding from about [0.1] *0.5* to 10% by weight of alumina, based on the $TiO_2$ pigment, as a sodium aluminate solution and simultaneously adding sulfuric acid to maintain the pH at approximately 3.5; (3) adjusting the pH to near neutrality with a base to precipitate hydrous aluminum oxide; (4) filtering the precipitate and washing it; (5) drying the filter cake; and (6) grinding the product under micronizing conditions to reduce aggregates therein to pigmentary particle size.

9. A white, pulverulent pigmentary composition comprising particles having cores of pigmentary, crystalline rutile titanium dioxide *which has been made by oxidizing titanium chloride,* said cores being coated with from 0.5 to 25% of amorphous, dense silica, and there being distributed around said particles from [0.1] *0.5* to 10% of precipitated alumina, the percentages of silica and alumina being calculated as $SiO_2$ and $Al_2O_3$ by weight, based on the $TiO_2$.

10. A composition of claim 9 wherein the titanium dioxide cores contain from 0.3 to 3% by weight of alumina dispersed substantially uniformly therethrough.

11. A composition of claim 9 wherein the amount of silica in the coating is from 5 to 10% by weight, based on the $TiO_2$ present.

*12. A white, pulverulent pigmentary composition comprising particles having cores of pigmentary, crystalline rutile titanium dioxide which has been made by hydrolytically precipititating $TiO_2$ from a sulfuric acid solu-*

*tion followed by calcination in the presence of up to 1% by weight of phosphate, calculated as $P_2O_5$, and treated to deactivate or leach the phosphate, said cores being coated with from 0.5 to 25% of amorphous, dense silica, and there being distributed around said particles from 0.1 to 10% of precipitated alumina, the percentages of silica and alumina being calculated as $SiO_2$ and $Al_2O_3$ by weight, based on the $TiO_2$.*

References Cited

The following references, cited by the Examiner, are of record in the patented file of this patent or the original patent.

UNITED STATES PATENTS

| | | | |
|---|---|---|---|
| 2,357,721 | 9/1944 | Allan | 106—300 |
| 2,387,534 | 10/1945 | Seidel | 106—300 |
| 2,591,988 | 4/1952 | Willcox | 106—300 |
| 2,885,366 | 5/1959 | Iler | 106—300 |
| 2,913,419 | 11/1959 | Alexander | 106—300 |
| 3,035,966 | 5/1962 | Siuta | 106—300 |
| 3,086,877 | 4/1963 | Sheehan et al. | 106—300 |
| 3,146,119 | 8/1964 | Ritter | 106—300 |

DELBERT E. GANTZ, Primary Examiner

U.S. Cl. X.R.

106—308 B